Jan. 6, 1970   A. H. KELLER ET AL   3,487,612
MOWER CRUSHER HAVING SELECTIVELY DRIVEN AND BRAKED REEL
Filed Dec. 20, 1966   4 Sheets-Sheet 2

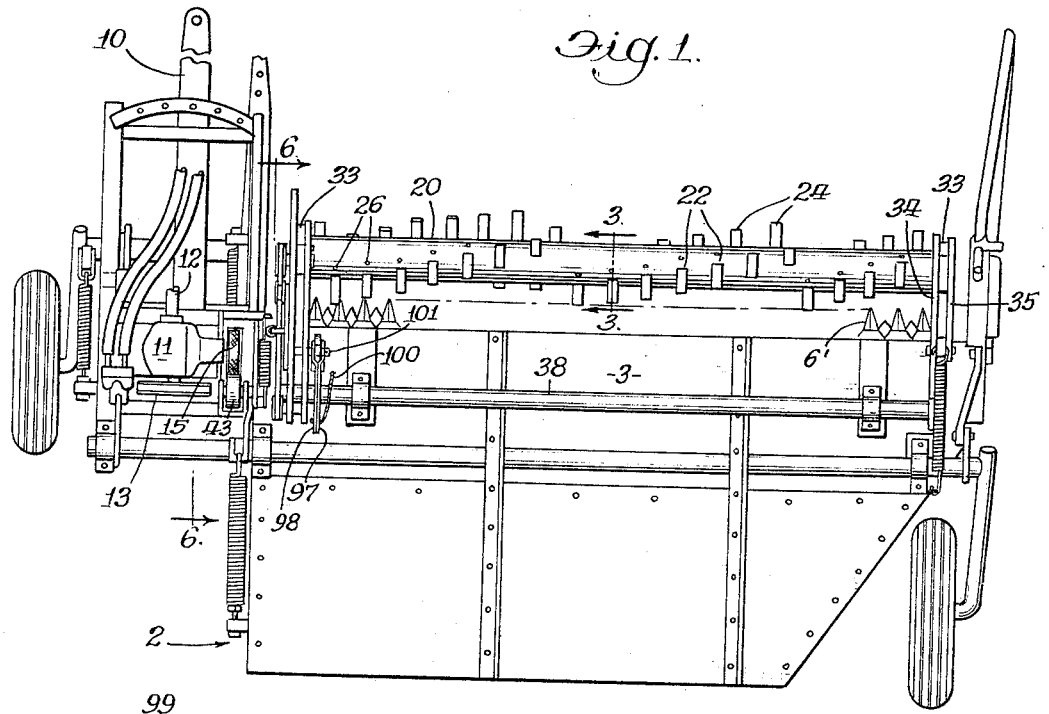
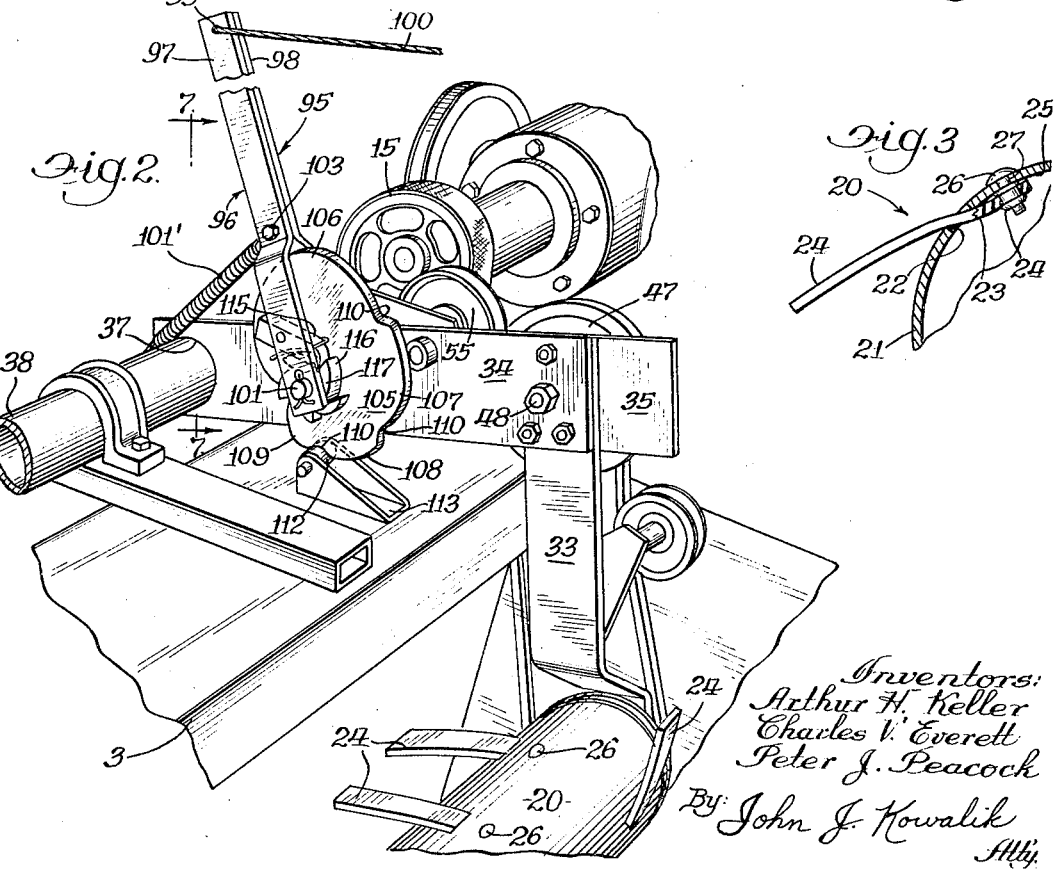

Inventors:
Arthur H. Keller
Charles V. Everett
Peter J. Peacock
By: John J. Kowalik
Atty.

Jan. 6, 1970     A. H. KELLER ET AL     3,487,612
MOWER CRUSHER HAVING SELECTIVELY DRIVEN AND BRAKED REEL
Filed Dec. 20, 1966     4 Sheets-Sheet 3

Inventors:
Arthur H. Keller
Charles V. Everett
Peter J. Peacock
By John J. Kowalik
Atty.

Jan. 6, 1970    A. H. KELLER ET AL    3,487,612
MOWER CRUSHER HAVING SELECTIVELY DRIVEN AND BRAKED REEL
Filed Dec. 20, 1966    4 Sheets-Sheet 4
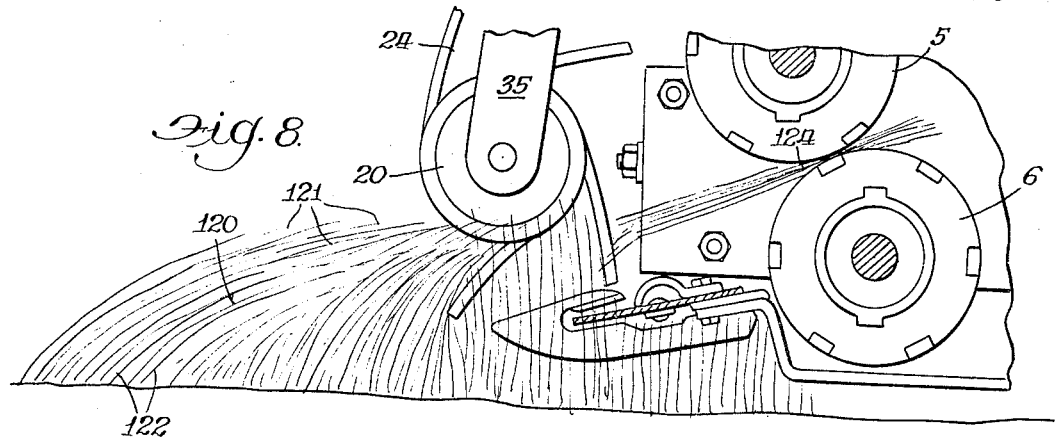
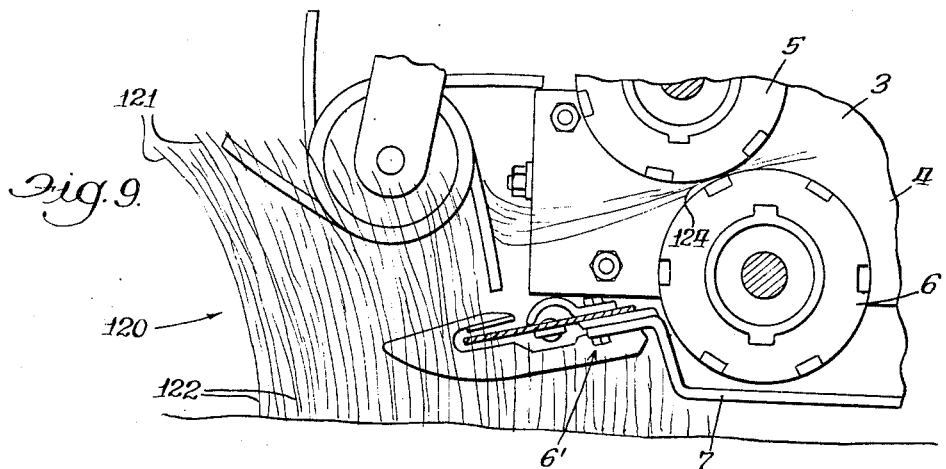
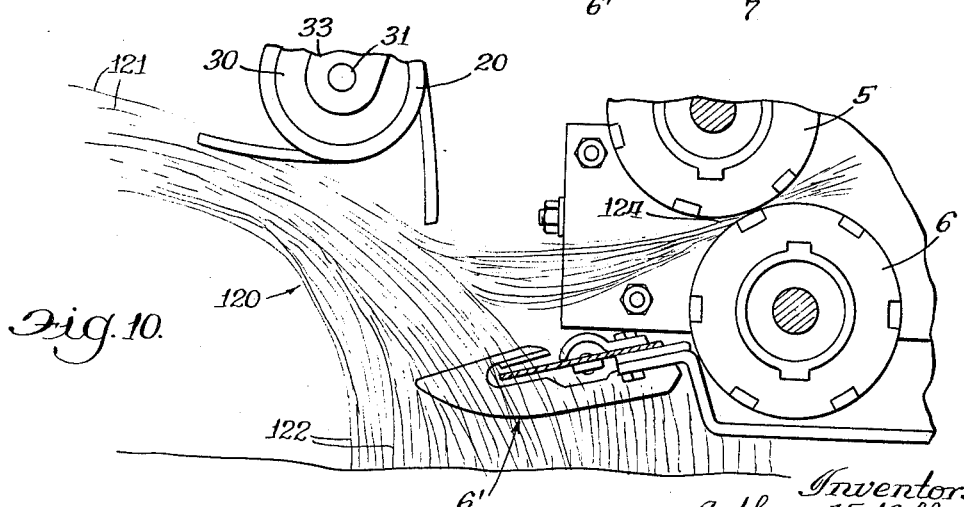
Inventors:
Arthur H. Keller
Charles V. Everett
Peter J. Peacock
By: John J. Kawalik
Atty.

United States Patent Office 3,487,612
Patented Jan. 6, 1970

3,487,612
MOWER CRUSHER HAVING SELECTIVELY DRIVEN AND BRAKED REEL
Arthur H. Keller, Western Springs, Charles V. Everett, Warrenville, and Peter J. Peacock, Western Springs, Ill., assignors to International Harvester Company, Chicago, Ill., a corporation of Delaware
Filed Dec. 20, 1966, Ser. No. 603,370
Int. Cl. A01d 69/00
U.S. Cl. 56—23                                11 Claims

ABSTRACT OF THE DISCLOSURE

A mower crusher power driven reel positioned in front of the mower and a brake and drive therefor to drive the reel or to stop the reel and a cam lift therefor.

CROSS REFERENCES TO RELATED APPLICATIONS

This invention is an improvement of the construction shown and described and claimed in a copending application of Edward J. Johnston et al., Ser. No. 439,588 filed Mar. 15, 1965 for: Method of Harvesting Crops and Apparatus Therefor.

BACKGROUND OF THE INVENTION

This invention relates to mower crushers for mowing and crushing crops in the field wherein there is provided a mechanism for bending the crops said mechanism being in the form of a reel which is driven to convey cut crops into the crushers under conditions where the crops are extremely sparse and wherein under normal conditions, that is, where the crop is of normal growth the reel serves as a break or bend bar in order to position the material in such manner that immediately upon its being cut the butt ends will flip into the crushers which are close coupled with the mower and wherein the reel is adapted to be braked and the teeth thereon are caused to comb through the material when the material is long and is oriented with the head ends of the plants toward the machine, the reel causing such material to be flipped forwardly of the machine so that the head ends are disposed forwardly of the butt ends whereby to prevent the crops from being grasped by the crusher rollers and pulled out of the ground prior to such plants being cut.

DESCRIPTION OF PRIOR ART

In prior art devices there is a necessity for providing an extremely large and ponderous reel structure for sweeping the cut crops from the mower over an extensive deck into the hay conditioning rollers. Such structure is not only extremely heavy but must be continuously run and requires a very large support undercarriage. None of the prior art has close coupled crusher rollers and the present problems are thus not contemplated.

SUMMARY OF THE INVENTION

The present structure contemplates the provision of a reel which also functions as a rake and is positioned over and ahead of the mower whereby the reel is to be driven for combing the hay into the hay conditioning roller in conditions wherein the hay is sparse, the reel being adapted to be free rolling under certain conditions and other conditions to be braked so that the teeth thereon can serve as a comb or as a rake combing the material forwardly of the machine whereby the material is caused to be presented to the machine butt ends first.

A further object of the invention is to provide a novel reel assembly readily adjustable to various crop conditions by means of a simple cam actuated lift mechanism operable from the tractor seat.

A still further object of the invention is to provide a novel arrangement for declutching the drive while alternately applying the brake.

Figure 4:
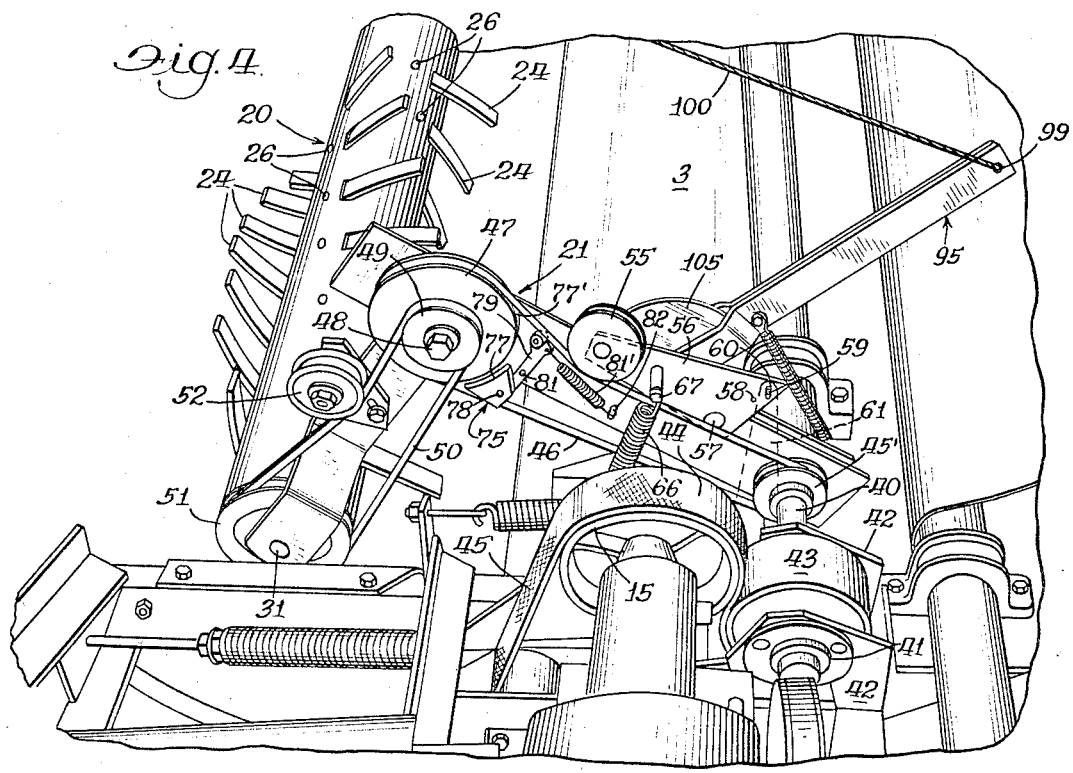
Figure 5:
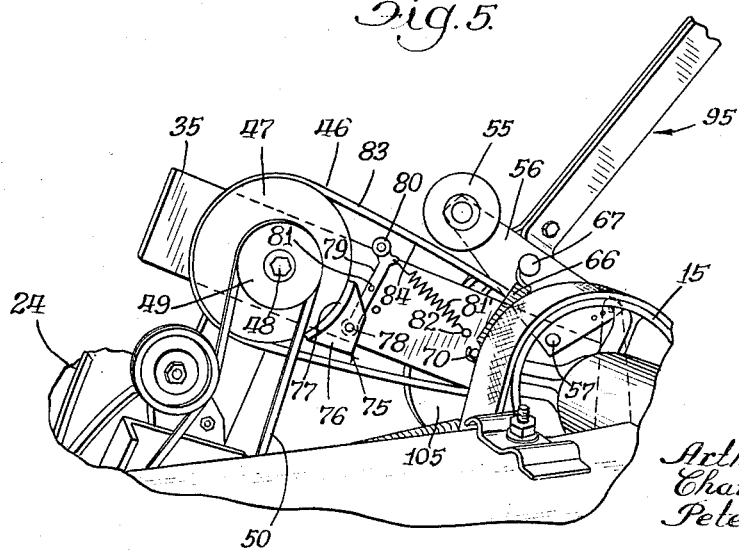
Figure 6:
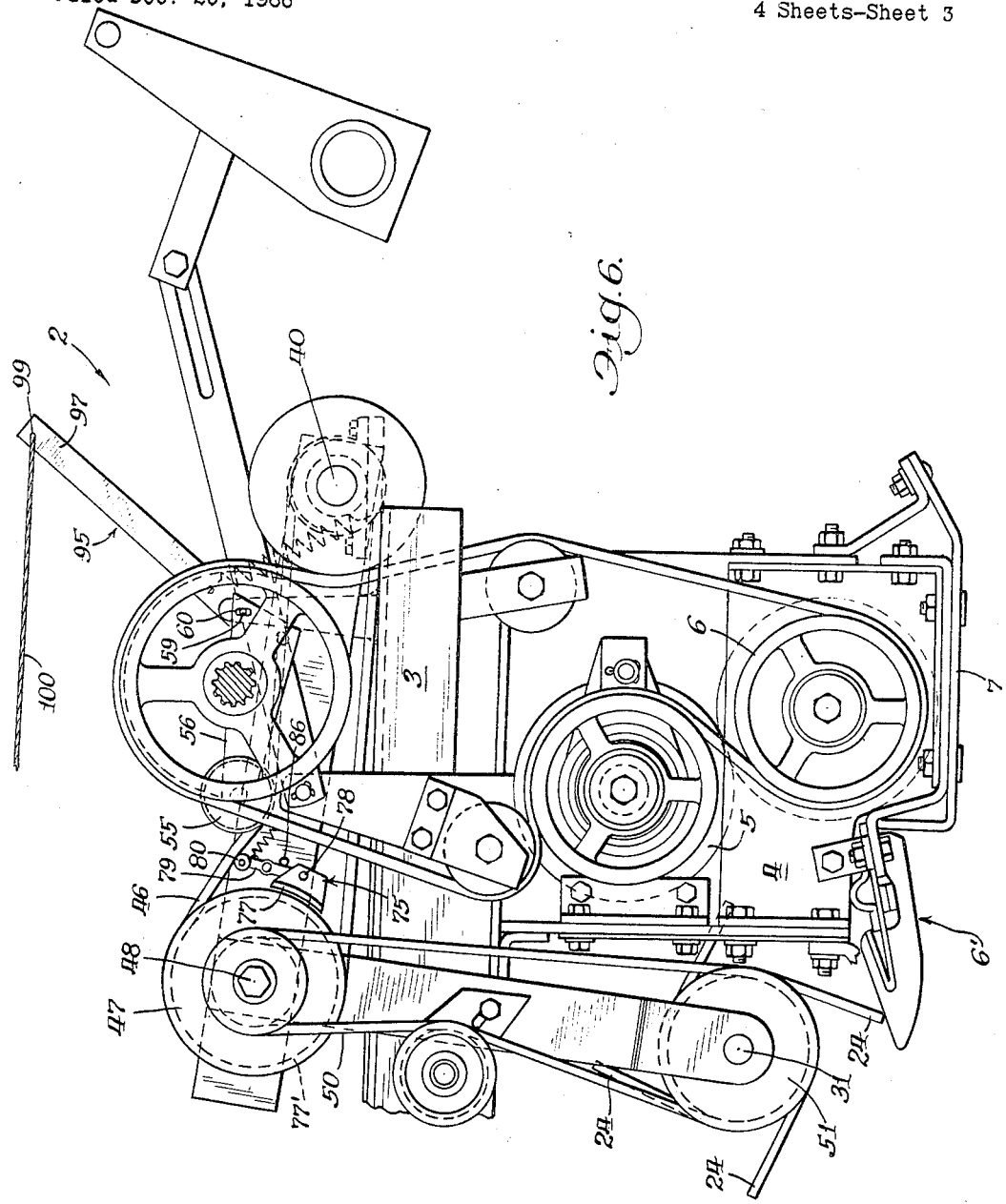
Figure 7:
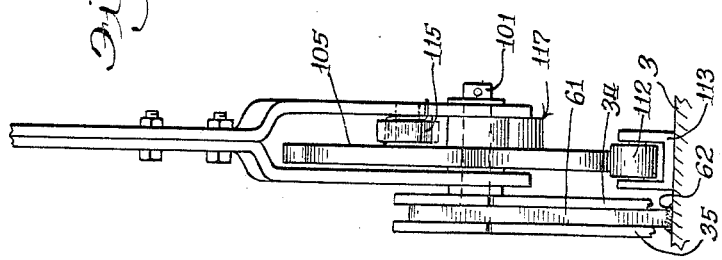

These and other objects and advantages inherent in and encompassed by the invention will become more readily apparent from the specification and the drawings wherein:

FIGURE 1 is a plan view of a mower conditioner incorporating the invention;
FIGURE 2 is a perspective view of the lift mechanism;
FIGURE 3 is enlarged fragmentary sectional view taken on line 3—3 to the reel;
FIGURE 4 is a further perspective view of the reel and drive therefor;
FIGURE 5 is a side elevational view of the drive mechanism for the reel;
FIGURE 6 is an enlarged sectional view taken substantially on line 6—6 of FIGURE 1 on an enlarged scale;
FIGURE 7 is an enlarged sectional view taken substantially on line 7—7 of FIGURE 2; and
FIGURES 8, 9, and 10 are each sectional views comparable to FIGURE 6, FIGURE 8 showing the operation of the mechanism wherein the reel is braked and wherein it serves to comb the material so that the head ends bend forwardly of the butt ends; FIGURE 9 showing reel being driven and rotating in sparse material and actually flipping the material into the rollers and FIGURE 10 showing the normal operating position of the roller wherein it is rolling and wherein it bends the material forwardly and the material, lying upon the uncut crop, upon being cut flips up into the crusher rollers.

DESCRIPTION OF THE INVENTION

Describing the invention in detail and having particular reference to the drawings there is shown a mower conditioner generally designated 2 which in all its general aspects is identical with or similar to that shown in copending U.S. application Ser. No. 439,588 filed Mar. 15, 1965 in the names of Edward J. Johnston and Peter J. Peacock for Method of Harvesting Crops and Apparatus Therefor now U.S. Patent 3,402,532 issued Sept. 24, 1968, and comprises a framework 3 incorporating side plates 4 on which are mounted a pair of upper and lower cooperating conditioning crusher rollers 5 and 6 for rotation on substantially horizontal transverse axes, these conditioning rollers being disposed immediately behind a sickle type mower 6' which is mounted to the lower cross member 7 of the frame structure, mower 6' being disposed immediately adjacent the rollers 5 and 6 and operating as stated in the aforementioned patent. The frame 3 is connected by a tongue 10 to an associated tractor for pulling thereby and for operating various components from the power take-off through the gear box 11 via input shafting 12 which connect to the gear box and from the gear box power is delivered to the pulley arrangement 13 as in the aforesaid patent and the drive for the rollers is through the shaft 14 and belt and pulley drive 15.

The instant invention is directed to a novel reel mechanism 20 and the drive generally designated 21a therefor, said reel comprising a hollow tube of cylindrical form generally designated 21 having a plurality of apertures 22 therethrough arranged in a spiral pattern as best seen in FIGURE 1. Each opening 22 receives the inner end portion 23 of a finger 24. Finger being of tire carcass or other yieldable resilient material. The end portion 23 is provided with a threaded nut 24' which abuts against the inner side 25 of the core 21 and is secured thereagainst by means of a stud bolt 26 which extends through an opening 27 in the core or sleeve 21. It will be seen that the fingers are curved circumferentially of the core rearwardly of their direction of rotation. However, upon rotation the fingers tend to straighten out.

The fingers are arranged in a spiral and rotate as indicated by the arrow in FIGURE 9. The reel 20 is provided at opposite ends of its core 21 with end plates 30 which have spindles or stub shafts 31 which are journaled for rotation in the lower ends of downwardly and forwardly extending arms 33 which at their upper ends are interposed between a pair of rearwardly extending arm portions 34, 35, the rear ends of which are journaled as at 37 by a cross member 38 which is in the nature of a pipe or tube. The cross member 38 is suitably secured to the frame structure 3. The axis of pivot of the arms 33 coincides with the axis of the input shaft 40 of the drive for the reel. This shaft 40 is carried in bearings 41 on a pair of spaced brackets which are suitably mounted and connected to the frame structure 3. The shaft 42 is keyed to a wheel 43 which peripherally engages the back side 44 of a belt 45 of the belt pulley drive 15 which drives the hay conditioning rollers. The shaft 40 is connected to a pulley 45' about which is trained belt 46 which in turn is trained about a pulley 47 rotatably mounted on shaft 48 at the forward end of the arm portions 34, 35. The pulley 47 is connected to a smaller companion pulley 49 about which is trained a belt 50 which is wrapped about a pulley 51. The pulley 51 is connected to the adjacent shaft 31 whereby the pulley 51 drives the reel 20. An adjustable idler pulley 52 is mounted on the arm 33 maintaining the belt 50 taut.

The belt 46 is clutched and declutched by means of an idler pulley 55 which is rotatably mounted on the forward end of the triangular shaped lever 56. The lever 56 is pivoted as at 57 on a substantially horizontal axis to the arm portions 34, 35 and being disposed therebetween. At a point rearwardly of the pivot axis 57 lever 56 is provided with a series of openings 58 and selectively receive a generally horizontal pin 59 which extends through a vertically elongated slot 60 in an upstanding anchor element 61.

Element 61 has its lower end connected as at 62 to a frame as best illustrated fragmentarily in FIGURE 7 and in dotted lines in FIGURES 5 and 4. Pulley 55 is biased toward the belt to tighten the same by means of a spring 66 which at its upper end is connected as at 67 to an anchor on lever 56 at a point ahead of the pivot axis 57 and spring 66 being connected as at 70 to the arms 34, 35.

Arm element 35 also carries immediate its forward end a brake assembly generally designated 75 as best seen in FIGURE 5. The brake assembly includes a head 76 which has a shoe 77 which is adapted to enter into groove 77 in pulley 47. The head 76 is pivotally mounted as at 78 on the lower end of a lever 79. The lever is pivoted as at 81 intermediate its ends to the arm 35 and at its upper end is provided with a roller abutment 86. The lever 80 is connected adjacent to its upper end to one end of a tension spring 81 which at its other end is connected as at 82 to the element 35. The spring 81 tends to pull the upper end of the lever 79 rearwardly and thus to urge the lower end of lever 79 forwardly and thereby engage the shoe 77 on head 76 with the pulley 47.

Engagement of the brake with the pulley 47 is accomplished attendant to the lower run 83 releasing pressure on roller 80 when the upper run of the belt is loose or disengaged, this occurring when the drive is disengaged that is upon the idler pulley 55 being raised upwardly as hereinafter disclosed.

It will be noted that in the position as shown in FIGURE 4 the lower side 84 of the belt 46 engages with the roller 80 and thereby biases the lever 79 in a counter-clockwise direction as seen in FIGURE 5 thereby disengaging the shoe 76 from the pulley 47. This occurs when the pulley 47 is being driven and the drive to the run is established as seen in FIGURE 4.

Clutching and declutching of the drive is controlled by novel positioning mechanism generally designated 95. This mechanism includes an upstanding lever assembly 96 comprised of a pair of side by side arranged elements 97, 98 which at their upper ends are provided with a common opening 99 in which is secured a rope or control element 100, said element 100 extending forwardly to a position adjacent to the operator's station on the tractor where it may be grasped by the operator for pull in a forward direction since normal position of the element 96 is diagonally rearwardly of its axis of pivot on the shaft 101, said position being attained automatically by means of a biasing tension spring 101 which at its rear end is suitably connected to an anchor on the frame 3 and at its forward end is connected as at 103 to the lever arm assembly 96. The legs 97, 98 embrace a cam element 105 therebetween which is provided with a plurality of lobes 106, 107, 108 and 109. It will be understood that the number of lobes is the option of the requirement for various heights and positions of the reel however it has been found that four positions normally are adequate. It will be observed that there are a series of pockets 110 defined between adjacent lobes. These pockets receive a roller 112 upon which the lobes of a cam ride. Roller 112 is mounted in a bracket 113 suitably mounted on the frame structure 3 as best seen in FIGURE 2. The cam element 105 rotates on the shaft 101 which is suitably connected to the arm members 34, 35 and leg 97 is provided with a spring pressed pawl 115 which is adapted to engage behind succeeding teeth 116 of a ratchet wheel 117 connected to the cam 105 whereby the cam and the ratchet wheel operate together. It will be seen that if as shown in FIGURE 2 the operator should want to modify the position of the reel 20 he merely pulls the cable 100 forwardly whereby the pawl-ratchet assembly 115, 116 is caused to advance the cam and engage roller 112 in a selected pocket 110. The operator releases his tension on the cable 100 and the arm assembly 96 springs rearwardly and panel 115 rides over the preceding ratchet tooth 116 while the next tooth is picked up and the operator again moves the lever assembly 96 forwardly and repeats the process until he obtains the desired height and condition of the reel.

It will be noted that as the arm assemblies 33 and the reel are lowered from the position shown in FIGURE 4 to a position shown in FIGURE 5 the lost-motion is taken up between the pin 59 and slot 60 and in a certain position the pin 60 engages the upper edge of the slot 59 and thereupon the lever 56 is caused to rotate in a clockwise direction until the belt 46 comes loose thereby the drive to the reel is declutched or interrupted. At the same time the lower rim 84 of the belt 46 leaves the roller 80 and thereby the spring 81 takes over and engages the brake shoe 86 with the pulley 47. Under these conditions the reel is lowered. Its rotation through engagement with the crop is resisted by the brake and the braking action being of only such magnitude as to resist rotation but not to prevent it entirely. This condition prevails in the circumstance shown in FIGURE 8 in which arrangement it will be noted that the reel 20 is lowered to its lowermost position and that the teeth or fingers 24 comb through the crops shown at 120 so that the crops as shown in the leftward portion of FIGURE 8 having their head ends 121 directed toward the machine are combed forwardly whereby the butt ends 122 of the hay crops are disposed first to the sickle and thus the head ends are prevented from entering into the intake nip 124 of the crushing rollers 5 and 6 prior to these plants being cut off by the mower at their butt ends. This situation prevails when the crop is long and wherein it is windblown or otherwise depressed and of such length that the head ends of the crop would normally enter into the crusher rollers before the butt ends would be cut off.

In the situation of FIGURE 9 it will be noted that the reel is elevated and in these circumstances it is used to propel sparse crops after they are cut into the nip 124.

In FIGURE 10 the illustration is of crops of the normal growth and therefore the mechanism will operate substantially as described in the aforementioned application wherein the succeeding crop to be cut serves as a fulcrum for the line of crops which are being cut which are bent forwardly by the reel 20 and caused to flip up into the nip 124.

Thus it will be seen that various crop conditions may be anticipated by the operator simply by adjusting and positioning the reel such that the reel can be powered to sweep the cut crop into the conditioning rolls or that it can be braked to reorient the material so that the cut butt end is presented first to the mower or if the crop itself is of sufficient density the roller may be free rolling and bend the crops so that it springs up onto the back of the crop which is not cut and self-feeds into the rollers.

It will be appreciated that various forms of the invention will be apparent from the instant disclosure which are intended to be covered by the appended claims.

What is claimed is:

1. In a crop conditioner comprising a mower and crushing roller means therebehind, a reel positioned above the mower ahead of the roller means, driving means, and selective means for optionally connecting said driving means for driving said reel and for disconnecting said driving means for not driving said reel.

2. The invention according to claim 1 and brake means optionally operative to brake said reel attendant to disconnection of said driving means.

3. In a harvester having a reel, means for driving the reel, and clutch means operative to connect and disconnect said means for driving the reel, means for varying the position of the reel and means operatively interconnecting the clutch means and reel for connecting and disconnecting said clutch means in accordance with selected positions of the reel.

4. The invention according to claim 3 and said drive means comprising a driven pulley connected to the reel and a driving pulley, a belt thereabout, said clutch means comprising an idler tightener biased to engage the belt and tighten the same, and said means operatively interconnecting the clutch and reel comprising means for elevating and lowering the reel mounting said idler for movement to positions tightening and loosening the belt.

5. The invention according to claim 1 and said conditioner having a frame, said driving means comprising driving and driven elements, and means mounting the reel for pivotal movement about a generally horizontal axis, and said selective means comprising clutch means operative between said elements mounted on said reel mounting means and linkage operative of the clutch means having a connection to said frame.

6. The invention according to claim 5 and said connection to the frame being a lost-motion connection.

7. The invention according to claim 5 and a belt trained about said elements, and said clutch means comprising a belt-tightener idler, and said linkage comprising lever means mounted on the means mounting the reel and carrying said idler.

8. The invention according to claim 1 and brake means interconnected with said driving means for braking the reel in accordance with selective conditioning of the driving means.

9. The invention according to claim 1 and arms carrying the reel for adjustment vertically about a transverse horizontal axis, and means for braking the reel upon the reel being disposed in a lowered position, and said driving means driving the reel in other positions.

10. The invention according to claim 1 and said reel having a plurality of flail-like fingers outwardly projecting and being of resilient material.

11. The invention according to claim 1 and means mounting said reel comprising arm means pivoted on a horizontal axis to the frame, and cam means on the frame engageable with and operative to raise and lower the arms means.

References Cited

UNITED STATES PATENTS

| 2,747,357 | 5/1956 | Bert et al. | 56—1 XR |
| 2,770,939 | 11/1956 | Berg et al. | 56—222 |
| 3,300,953 | 1/1967 | Glass | 56—23 |
| 3,397,520 | 8/1968 | Johnston et al. | 56—1 |

ANTONIO F. GUIDA, Primary Examiner